US012810827B2

(12) United States Patent
Uleberg-Cohen et al.

(10) Patent No.: US 12,810,827 B2
(45) Date of Patent: Nov. 24, 2026

(54) APPARATUS FOR TRIMMING TANGS FOR A STRINGED INSTRUMENT, AND RELATED METHODS

(71) Applicant: Mariann Uleberg-Cohen, Somerville, MA (US)

(72) Inventors: Mariann Uleberg-Cohen, Somerville, MA (US); David Austin Cohen, Somerville, MA (US)

( * ) Notice: Subject to any disclaimer, the term of this patent is extended or adjusted under 35 U.S.C. 154(b) by 0 days.

(21) Appl. No.: 19/208,457

(22) Filed: May 14, 2025

(65) Prior Publication Data

US 2025/0356823 A1 Nov. 20, 2025

Related U.S. Application Data

(60) Provisional application No. 63/647,854, filed on May 15, 2024.

(51) Int. Cl.
*G10D 3/22* (2020.01)
*B26D 1/12* (2006.01)

(52) U.S. Cl.
CPC ............... *G10D 3/22* (2020.02); *B26D 1/125* (2013.01)

(58) Field of Classification Search
CPC . G10D 3/22; G10D 3/00; B26D 1/125; B26D 1/12; B26D 1/01; B26D 1/00
USPC .................................. 29/896.22, 896.2, 592
See application file for complete search history.

(56) References Cited

U.S. PATENT DOCUMENTS

| | | | | | |
|---|---|---|---|---|---|
| 3,273,439 | A * | 9/1966 | Keefe | G10D 3/22 | 984/115 |
| 3,911,778 | A * | 10/1975 | Martin | G10D 3/22 | 984/106 |
| 4,037,510 | A * | 7/1977 | Ginex | G10D 1/08 | 984/115 |
| 5,072,643 | A * | 12/1991 | Murata | G10D 1/00 | 84/293 |
| 5,952,593 | A | 9/1999 | Wilder | | |
| 6,613,969 | B1 * | 9/2003 | Petillo | G10D 3/22 | 84/314 R |
| 7,763,786 | B2 * | 7/2010 | Jones | G10D 3/06 | 84/314 R |
| 7,767,890 | B2 * | 8/2010 | Stein | G10D 3/22 | 84/267 |

(Continued)

OTHER PUBLICATIONS

LMI Fret Tang Filer OBrianGuitars ('LMI hereafter); https://www.youtube.com/watch?v=8kj0rLp9ny4; Date Oct. 30, 2013.*
https://www.stewmac.com/luthier-tools-and-supplies/tools-by-job/tools-for-fretting/pullers-nippers-sizing/stewmac-deluxe-fret-tang-nipper/).
https://www.jescarguitar.com/shop/summit-special-fret-tang-cutter-adjustable-universal/.

(Continued)

*Primary Examiner* — Lawrence Averick
(74) *Attorney, Agent, or Firm* — J. Mark Holland

(57) ABSTRACT

Methods and apparatus are disclosed for improved preparation of fret wire for installation and/or use on stringed musical instruments and/or similar devices and processes. Apparatus can include one or more of the following components, in modular and/or combined form: one or more baseplates, one or more rotary cutting tools, one or more fret wire Guide Blocks, one or more Guide Block Mounts, one or more Guide Block Mount Plates (Sled Plates), and one or more depth stops. Modular embodiments and assemblies can permit ready adjustability for different instrument specifications and precise control over the process and frets produced.

19 Claims, 23 Drawing Sheets

(56) References Cited

U.S. PATENT DOCUMENTS

| | | | | |
|---|---|---|---|---|
| 8,039,720 B2* | 10/2011 | Stein | G10D 3/22 | 84/267 |
| 8,937,236 B2* | 1/2015 | Kunstadt | G10D 3/22 | 84/314 R |
| 9,520,109 B1 | 12/2016 | Edwards | | |
| 10,403,167 B2* | 9/2019 | Borko | G09B 15/023 | |
| 2008/0190264 A1* | 8/2008 | Jones | G10D 3/22 | 84/314 R |
| 2010/0005943 A1* | 1/2010 | Stein | G10D 3/22 | 84/269 |
| 2010/0064878 A1* | 3/2010 | Stein | G10D 3/22 | 84/314 R |
| 2014/0157968 A1* | 6/2014 | Kunstadt | G10D 3/22 | 29/896.22 |
| 2018/0308380 A1* | 10/2018 | Borko | G10D 1/05 | |
| 2025/0058423 A1* | 2/2025 | Ertl | B24D 15/02 | |

OTHER PUBLICATIONS https://www.amazon.com/4-5-Inch-Diamond-Concave-Concrete-Sinkwork/dp/B08HK4W5RC?th=1.
https://www.ebay.com/itm/145112017575.
https://www.ebay.com/itm/364202322743.
https://www.aliexpress.us/item/3256804076618275.html?gatewayAdapt=glo2usa4itemAdapt.
https://www.lm76.com/V%20Groove%20Roller%20Block%20and%20Rail%20System.html.
https://www.eptecstore.com/product/dobot/.
StewMac Fret Tang Nipper: (https://www.stewmac.com/luthier-tools-and-supplies/tools-by-job/tools-for-fretting/pullers-nippers-sizing/stewmac-fret-tang-nipper/).
LMII Fret Tang Filer: (https://youtu.be/8kj0rLp9ny4?si=mlM38JoZnW8dD6SG).
Luthiers Mercantile International (https://www.lmii.com/).

* cited by examiner

APPARATUS FOR TRIMMING TANGS FOR A STRINGED INSTRUMENT, AND RELATED METHODS

CROSS-REFERENCE TO RELATED APPLICATIONS

This application claims priority to U.S. Provisional Application Ser. No. 63/647,854, filed May 15, 2024, the disclosures of which are incorporated herein by reference in it's entirety.

FIELD OF THE INVENTION

The present inventions are directed to apparatus and methods for constructing, preparing, repairing, and/or installing fret wire into stringed musical instruments.

BACKGROUND OF THE INVENTION

The vast majority of guitars, bass guitars, banjos, mandolins, and other Western stringed-instruments include a "neck" element, to which the strings are attached at its distal end, and a "body" element, to which the other end of each string is anchored. Typically, the instrument's strings run over a piece of material called the "nut" close to the distal end of the neck, over a playing surface called a "fretboard" or "fingerboard" and continue over the body until they contact another piece of material called the bridge, eventually terminating at some type of string-anchoring mechanism. Typically the strings are set up at a slight distance above the fretboard, so that each string is able to vibrate between the nut and the bridge without unwanted interference.

Typically, these instruments also include pieces of formed metal wire called "frets," which are installed in the fretboard at specific locations, and they enable a player to precisely control the sounding frequency of each string. By depressing a string against a given fret, the player can effectively shorten the length of the vibrating portion of the string relative to the bridge (compared to its normal "full" length), thereby raising its frequency or "pitch," when the string is plucked or otherwise strummed or played. If the string is plucked without being depressed against a fret, this is called its "open note," the frequency of which being dictated by the distance between the nut and the bridge in conjunction with the tension to which the string has been tightened.

Typically, a modern fret is cut and processed from a longer piece of metal or similar material that is called fret wire. The fret wire commonly is shaped and provided with the following portions, and the "cut/finished" fret made from that fret wire typically consists of:

The "Crown": Typically, this is a semi-elliptical section which (after installation into the instrument's fretboard) protrudes from the fretboard toward the string(s). Typically when a user/musician presses the string toward the fretboard in such a way that it makes contact with a selected fret, (shortening its effective vibrating length and altering its pitch, as described above) the crown is the part of the fret with which the string makes contact.

The "Tang": The tang is a generally vertically-oriented strip of material which extends from the bottom of the fret crown (away from the string(s) and toward the fretboard) and which is inserted into a corresponding slot in the fretboard ("Fret Slot").

The "Barbs": Barbs are small, pointed protrusions on the sides of the fret tang which are sized and positioned and of a sufficient quantity to "dig into" the walls of the fret slot during installation and frictionally or otherwise prevent the fret from being inadvertently lifted out of its slot. In other words, the barbs typically help "anchor" the tang into its desired relationship and position in the fret slot.

For the purpose of comfort for the user's "fretting-hand" or otherwise, many instruments have a convex curvature milled, sanded, or otherwise shaped into the string side face of the fretboard, falling away laterally from its centerline.

In order for the instrument to perform "optimally" or at least "correctly," each fret generally must be (a) radiused to match that lateral curvature of the fretboard, and (b) installed with the tang fully and securely seated in its slot, such that the bottom of the crown rests flush against the top (string-facing) surface of the fretboard. If the fret is not firmly seated in its slot, it may resonate independently from the rest of the instrument, and/or the fret may absorb at least some of the vibrational energy of the string that has been depressed against it. As a result, the "loose" fret can deaden or otherwise undesirably affect the note's intended sound.

In addition, each successive fret must be installed so that the top of each respective fret crown is level with the tops of the fret crowns adjacent to it. If they are not level with adjacent fret crowns, the vibrating string may make contact with and/or resonate undesirably against those adjacent frets and create a metallic noise known as "fret-buzz."

Due to the difficulty, precision, and expertise required, the processes of preparing, installing, replacing, and performing the final shaping of the frets on stringed instruments (called "fretwork") is one of the most important and valuable (but also time-consuming) jobs in any instrument-manufacturing company or repair shop.

Although the above-mentioned difficulties (and need for precision and expertise) are true even for working on the simplest of fretboards (which may be those with fret-slots that have been cut completely across the entire lateral width of the fretboard, using a sawblade or other process or tool), fretwork can be made even more challenging by common variations in instrument construction, such as those that obstruct the otherwise open ends of each fret slot. Such variations include:

Bound Fretboards: Fretboards which have a channel routed into their perimeter, and into which channel a strip of decorative material (or "binding") has been inlaid. The fret slots on these fretboards extend only between the "inlaid" material at the perimeter of the fretboards and are therefore shorter than normal ("full-width") fret slots.

Fretboards with "Blind" Fret-Slots: Fretboards with fret-slots that have been milled into the top surface of the fretboard using a tool such as an endmill (as opposed to being cut completely through the entire lateral width of the fretboard, via a sawblade or other process or tool), and which do not fully extend through the perpendicular edges of the fretboard, thereby giving the appearance and tactile feel of a bound fretboard from the side-view.

Fretboards with Filled Fret-Slots: Fretboards with slots that have been cut through the perpendicular edges of the fretboard (like the "simple" versions mentioned above), but which have been subsequently blocked at the ends with lacquer, glue or another filler compound for the purposes of both aesthetics and the user's/player's comfort (so that the user's hand can more smoothly slide along the entire length of the instrument's neck).

For guitars or other instruments with the above-mentioned construction variations, their frets typically require that a portion of the fret tang be precisely removed from the end of each fret end (a process known as "undercutting"), while leaving the fret's crown entirely intact (in order to leave a normal fret's full width across the instrument's neck). As a result of such undercutting, the crown of each fret is "longer" than its tang, and rests across the entire lateral width of the fretboard with the "ends" of the crown resting on top of the obstructed ends of each shorter fret slot.

Additionally, over the last few decades, increasing numbers of instrument manufactures have transitioned from the use of fret wire made from softer metal alloys (such as "Nickel silver"), to fret wire made from much harder metal alloys (such as Silicon-Bronze and Stainless Steel). These modern fret wire materials are desirable for many reasons (for example, they are more durable and can take and maintain a much higher polish), but by comparison they are far more difficult to cut and shape and can easily blunt most fretwork tools.

The traditional process of undercutting fret wire involves using either a sharp, flush, ground metal-cutter or squared-edge metal file to remove the bulk of the section of fret tang to be undercut, and then using a finer flat or round metal file to remove the remaining material until only the crown remains at the end of each fret. This process is slow, tedious and physically taxing, and is very difficult to accomplish with precision, even when performed by a person with years of experience. Prior efforts have been made to try to improve the process of fretwork and undercutting, but there continues to be a need for improving the speed, ease of use, precision, and/or versatility of these processes. Some of those prior efforts are discussed below.

StewMac Fret Tang Nipper: (https://www.stewmac.com/luthier-tools-and-supplies/tools-by-job/tools-for-fretting/pullers-nippers-sizing/stewmac-fret-tang-nipper/) Consists of a hand-held compound lever mechanism with a steel guide channel (FIG. 14, #41) into which the fret crown is seated, and a retracting cutter (FIG. 14, #42) which removes sections of fret tang.

Shortcomings of the StewMac Fret Tang Nipper include the tool is only fully effective with unradiused fret wire since the guide and cutter are straight. Operating the tool on radiused frets leaves a ridge of fret tang that must subsequently be removed by hand. Due to the relatively low hardness of the edge of the retracting cutter, it is unsuitable for use with stainless steel fret wire. As the blade in the tool blunts, it can bend or gouge frets. Fret-material cutoffs (the portion of the tangs being removed) can (a) get pulled into the opening (FIG. 14, #43) into which the blade retracts and (b) jam it.

The StewMac Deluxe Fret Tang Nipper: (https://www-.stewmac.com/luthier-tools-and-supplies/tools-by-job/tools-for-fretting/pullers-nippers-sizing/stewmac-deluxe-fret-tang-nipper/) is similar to the StewMac Fret Tang Nipper tool in FIG. 14. The StewMac Deluxe Fret Tang Nipper (FIG. 15) consists of a hand-held set of flush trimmers with a steel guide channel (FIG. 15, #44) for the fret crown but uses a pair of hardened steel jaws (FIG. 15, #45) for removing fret tang material, and has replaceable guides (FIG. 15, #46) to accommodate different sizes of fret wire. The deluxe version also has an adjustable depth stop (FIG. 15, #47) which can be set to limit how far the fret wire can be fed into the cutter.

Although it is claimed to be strong enough to process stainless steel fret wire, the StewMac Deluxe Fret Tang Nipper tool still has straight guides and cutters, and so it is also only fully effective with unradiused frets. The depth stop must be reset every time the fret wire guide is replaced.

Summit Fret Tang Cutter (https://www.jescarguitar.com/shop/summit-special-fret-tang-cutter-adjustable-universal/). The Summit Cutter (FIG. 16) is nearly identical to the StewMac Deluxe Fret Tang Nipper (FIG. 15) except that the fret wire guide (FIG. 16, #48) and depth stop assembly is attached to the distal end of the tool, as opposed to a perpendicular extended face. Like the StewMac Deluxe, the Summit Fret Tang cutter is also only fully effective with unradiused frets.

LMII Fret Tang Filer: (https://www.lmii.com/fretting-setup-tools/2796-fret-tang-filer.html). The LMII Fret Tang Filer (FIG. 17) utilizes a cam clamp (FIG. 17, #49) which frictionally holds the fret in position on a free-sliding base (FIG. 17, #50). The base is then guided along the surface of a melamine-topped panel (FIG. 17, #51), such that the exposed end of fret wire is run across the exposed edge of a fixed flat file (FIG. 17, #52) until the tang has been filed off.

However, the included flat file is manufactured from hardened steel and blunts relatively quickly from processing stainless steel fret wire. The device and its flat file are not suited for processing radiused fret wire; the edge of this flat file that engages with the piece of fret wire to be undercut is an approximated flat surface fixed in a parallel orientation relative to the melamine-topped base panel, as well as to the top plane of the cam clamp assembly. Since this top plane is the surface to which a piece of radiused fret wire would be clamped, and this piece of fret wire must extend past the edge of the cam clamp assembly for it to engage with the flat file, the piece of fret wire's radius dictates that the end of this piece of fret wire will naturally arc below this plane as it extends beyond the cam clamp assembly. Consequently, as this radiused piece of fret wire engages with the flat file, a flattened bottom plane will be created below the radiused crown, resulting in varying crown height from the beginning to the end of each undercut. Replacement flat files can often have varying edge geometry, thereby yielding inconsistent results.

Practicing either the traditional flat file method of fret wire undercutting, or any of the art described above has an inherent degree of imprecision, where there is a near guarantee of either too little or too much material being removed during processing. If too little material is removed, the tang will need to be filed flush with the underside of the crown by hand, and if too much material is removed, the final fret leveling process will take longer than preferred. Regardless of the method, the time invested and likelihood of an imperfect result are significant.

The inventions and methods disclosed herein are able to achieve an objectively better result, with tremendous time savings compared to previous methods, and by means of a process which is less physically taxing to the practitioner. By comparison, a stainless steel fret end that is undercut with the StewMac Deluxe Fret Tang Trimmer and necessarily filed to a satisfactory result takes approximately 30 seconds to accomplish, while the inventions disclosed herein are able to achieve a better result in 2 seconds. This difference extrapolated across the 48 fret ends on a 24-fret guitar, results in an average time expenditure of (a) 24 minutes being reduced to (b) 1.6 minutes for this process alone. This is a time savings of 22.4 minutes per guitar.

As a real-world example of the immense benefit that the inventions will have on the industry; one company that was surveyed produced on average 20 guitars per week. If an employee was paid a $16/hour minimum wage (California 2022 for companies with less than 50 employees) to perform this job, the 22.4 minutes saved per guitar would equate to a yearly wage savings of $6,212.27 for the employer. This also doesn't include the extra time required in leveling and recrowning frets that have not been undercut with the inventions, nor does it account for the physical fatigue than accompanies the traditional methods, so the actual time savings and consequential financial benefit of the inventions is likely much greater than this estimation.

SUMMARY OF THE INVENTION

As disclosed herein (and as otherwise will be understood by persons of ordinary skill in the art), the present inventions provide many advantages. Among other things, the present inventions provide apparatus and methods that, in various embodiments, can improve the processes of fret-cutting. The current inventions address the shortcomings discussed above, among others. Instead of using files or cutters, certain embodiments of the inventions utilize a rotary tool with a cutting implement to precisely remove the desired portion of the fret tang, while leaving the remainder of the fret crown intact. The rotary tool can be a handheld router mounted on a fixed position in a jig, or any other suitable rotary device (including one permanently dedicated and assembled within a more permanent assembly). In certain embodiments, the apparatus is adjustable to be able to accommodate virtually any fret radius and dimension. The cutting implements can be manufactured with precise tolerances and from material intended for the cutting of hardened metals such as stainless steel. In certain embodiments, a "depth stop" can be set to allow for the removal of the same length of fret tang from each fret end to be processed, eliminating the need for tedious re-measurement. A jig/guide assembly preferably can be positioned adjacent to the cutting bit and can be customized to the desired fret-cutting exercise (such as undercutting) and provide fast and accurate and repeatable processing of the frets.

The present inventions are described herein with reference to the accompanying Figures, which serve as illustrations of some of the many embodiments in which the inventions may be practiced. Subject to the context and other factors (including for example the understanding of persons of ordinary skill in the arts relevant to the inventions), in those Figures similar reference numerals generally refer to similar or identical elements throughout this description.

Those Figures and references, and the other terminology used in these descriptions, are not intended to be interpreted in any limited or restrictive manner, simply because they may be utilized in conjunction with a detailed description of one or more embodiments of the inventions. Furthermore, various embodiments of the invention (whether or not specifically described herein) may include one or more of the features disclosed herein, no single one of which (a) is necessarily solely responsible for any particular desirable attribute(s) of the inventions or (b) is essential to practicing the inventions described.

Other features and advantages of the present inventions will become apparent from the following more detailed description, taken in conjunction with the accompanying drawings, which illustrate, by way of examples, various principles of the inventions.

BRIEF DESCRIPTION OF THE DRAWINGS

FIG. 11A is an end view taken along line 11A-11A in FIG. 11B.

DETAILED DESCRIPTION OF THE INVENTIONS

In certain embodiments, the apparatus of the inventions includes one or more of the following elements, alone and/or in various combinations:

A Baseplate (FIG. 4, #13) which may be mounted to a bench (FIG. 4, #12) by clamps, screws or other holding methods and to which a motorized rotary tool can be fixedly attached.

Guide Blocks (FIG. 4, #18) which serve as guides for either radiused or unradiused frets and which match the radius of the frets to be installed. The guide blocks help the user maintain a consistent trajectory as they feed the fret wire into the cutting implement and help to minimize lateral deflection of the fret wire under the torque of the cutter during operation. Persons of ordinary skill will appreciate that the guide blocks may be available in a multitude of flat and radiused embodiments to accommodate the multitude of variations in specifications of the instruments to be fretted.

Guide Block Mounts (FIG. 4, #19) to which the Guide Blocks are fixedly attached, and which keep the Guide Blocks in proper alignment relative to each other.

A Guide Block Mount Plate or Sled Plate (FIG. 4, #22) to which the Guide Block Mounts are adjustably attached (via two machine screws), allowing the user to set the space between the Guide Bocks to accommodate the width of the fret tang to be removed. The Sled Plate 22 is adjustably attached to the Baseplate 13 such that the entire Guide Block Assembly can be moved closer to or farther away from the cutting implement as needed for proper operation.

A Depth Stop (FIG. 4, #24) which sets the maximum distance that the fret crown can travel past the cutting implement, for precisely repeatable operations.

A Cutting Implement (FIG. 4, #17) into which the piece of fret wire is fed and which removes the intended portion of fret tang.

Figure 4:
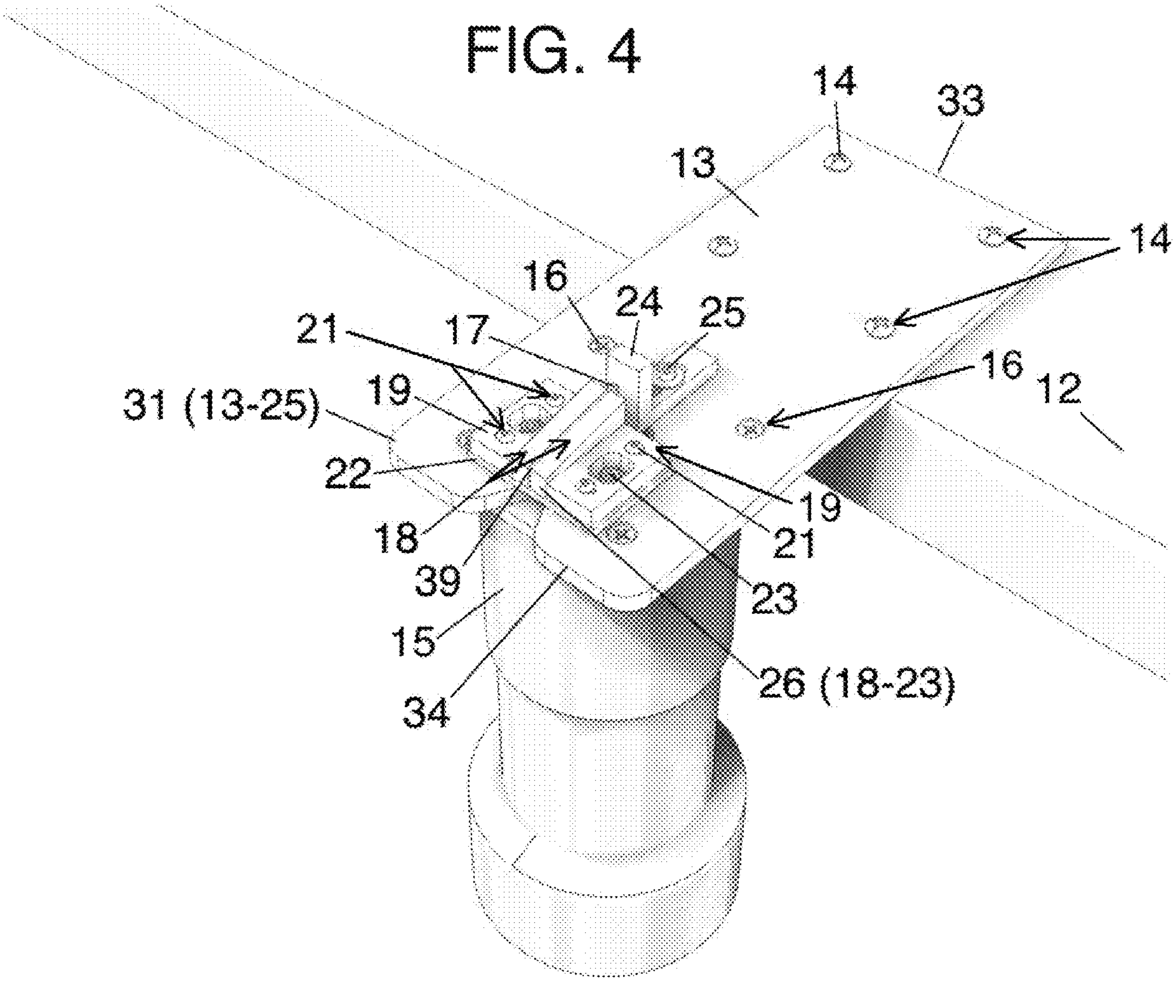
FIG. 4 shows the preferred embodiment of the inventions assembled and mounted to a workbench.

The combined Sled Plate, Guide Block Mounts and Guide Blocks and corresponding mounting hardware will be referred to herein as the "guide block assembly" or "assembly" (FIG. 4, #26).

Figure 13:
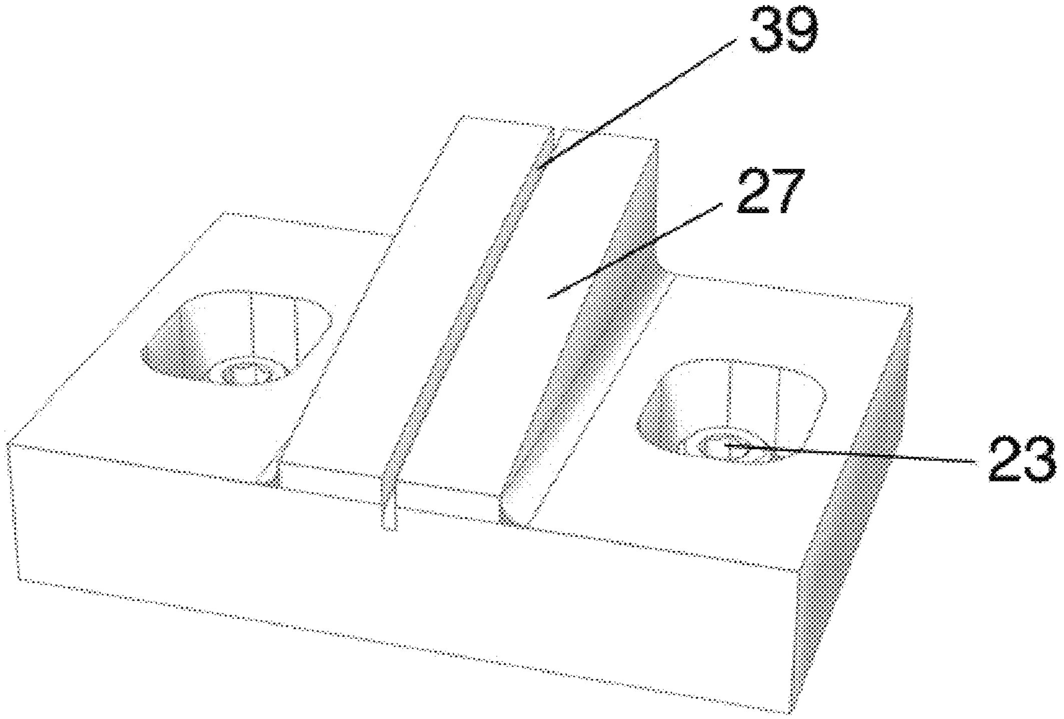
FIG. 13 is an alternative monolithic embodiment of the guide block assembly.
Figure 14:
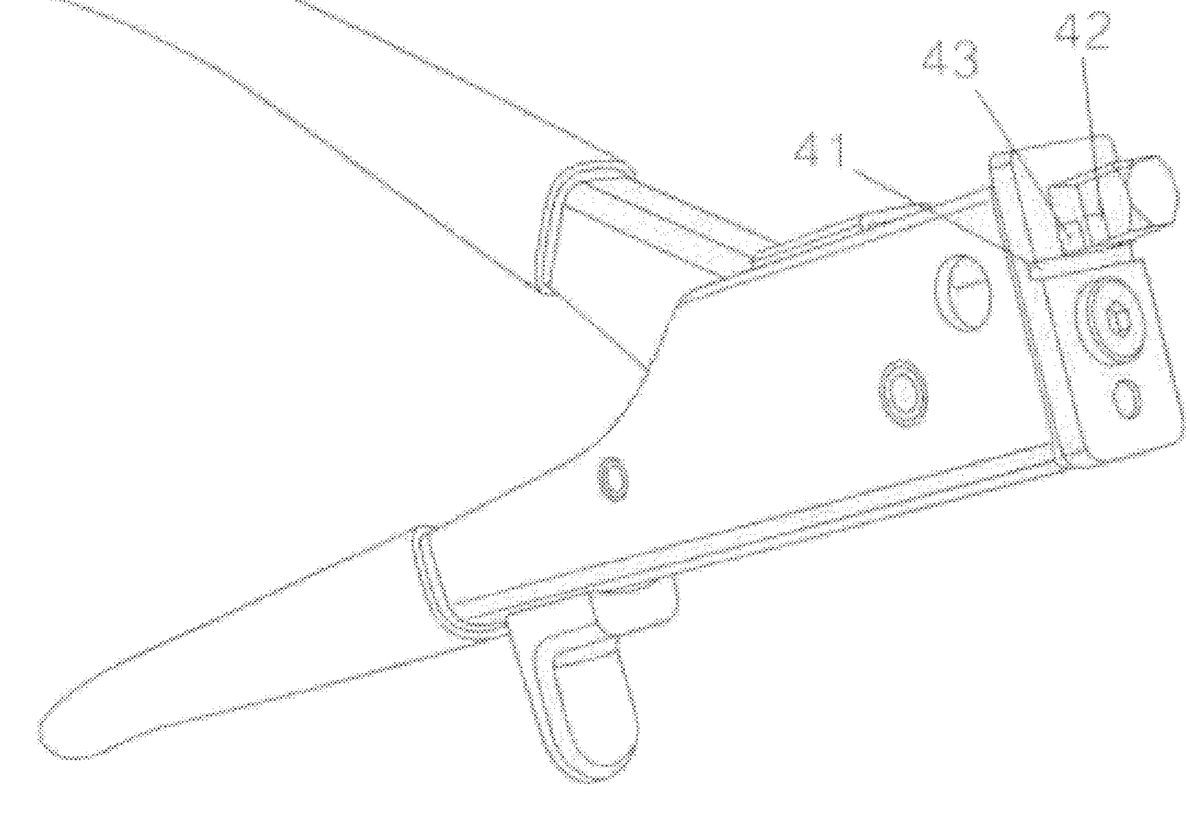
FIG. 14 PRIOR ART
FIG. 14 is PRIOR ART illustrating the features of the StewMac Fret Tang Nipper.
Figure 15:
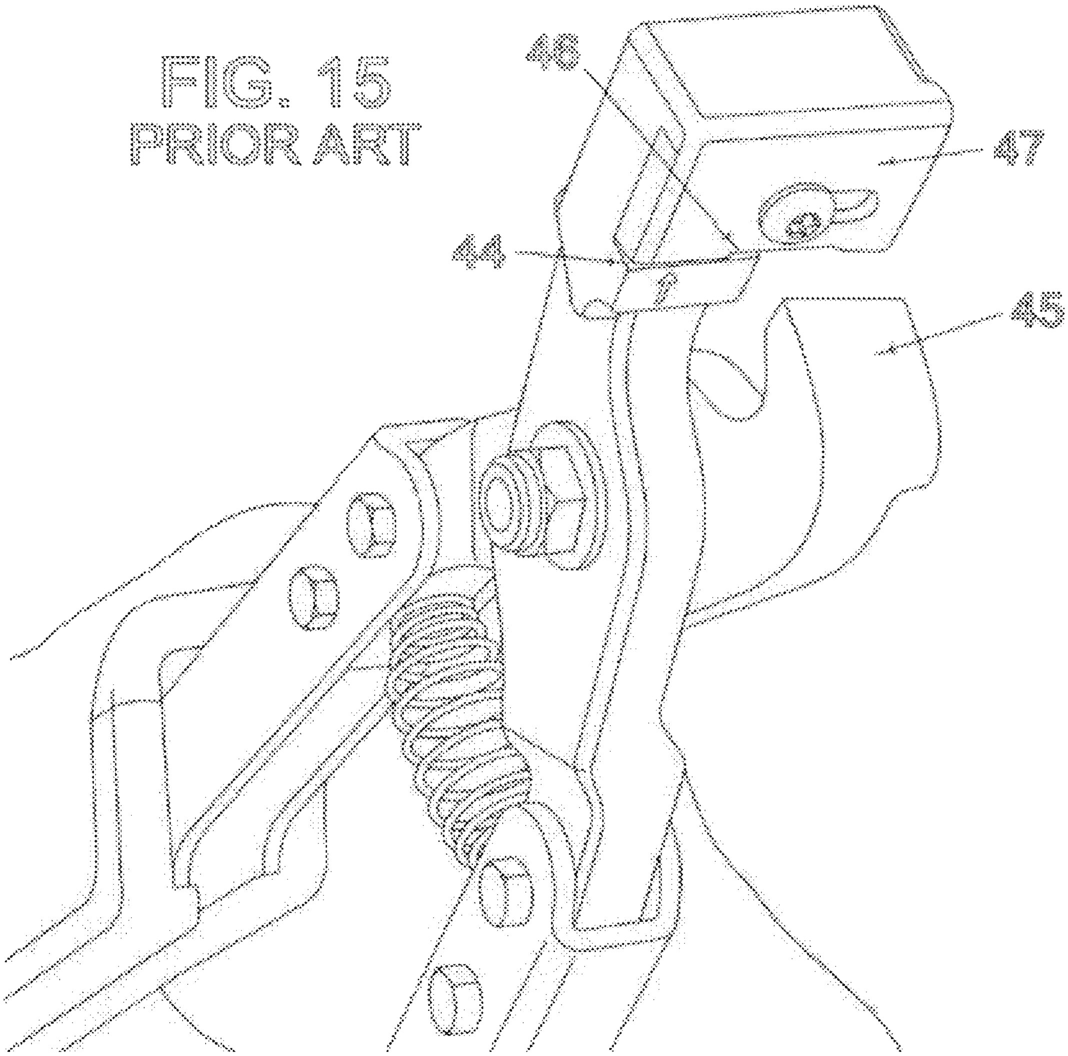
FIG. 15 PRIOR ART
FIG. 15 is PRIOR ART illustrating the features of the Deluxe StewMac Fret Tang Nipper. It includes a portion of a user's hand in the photograph/drawing.
Figure 16:
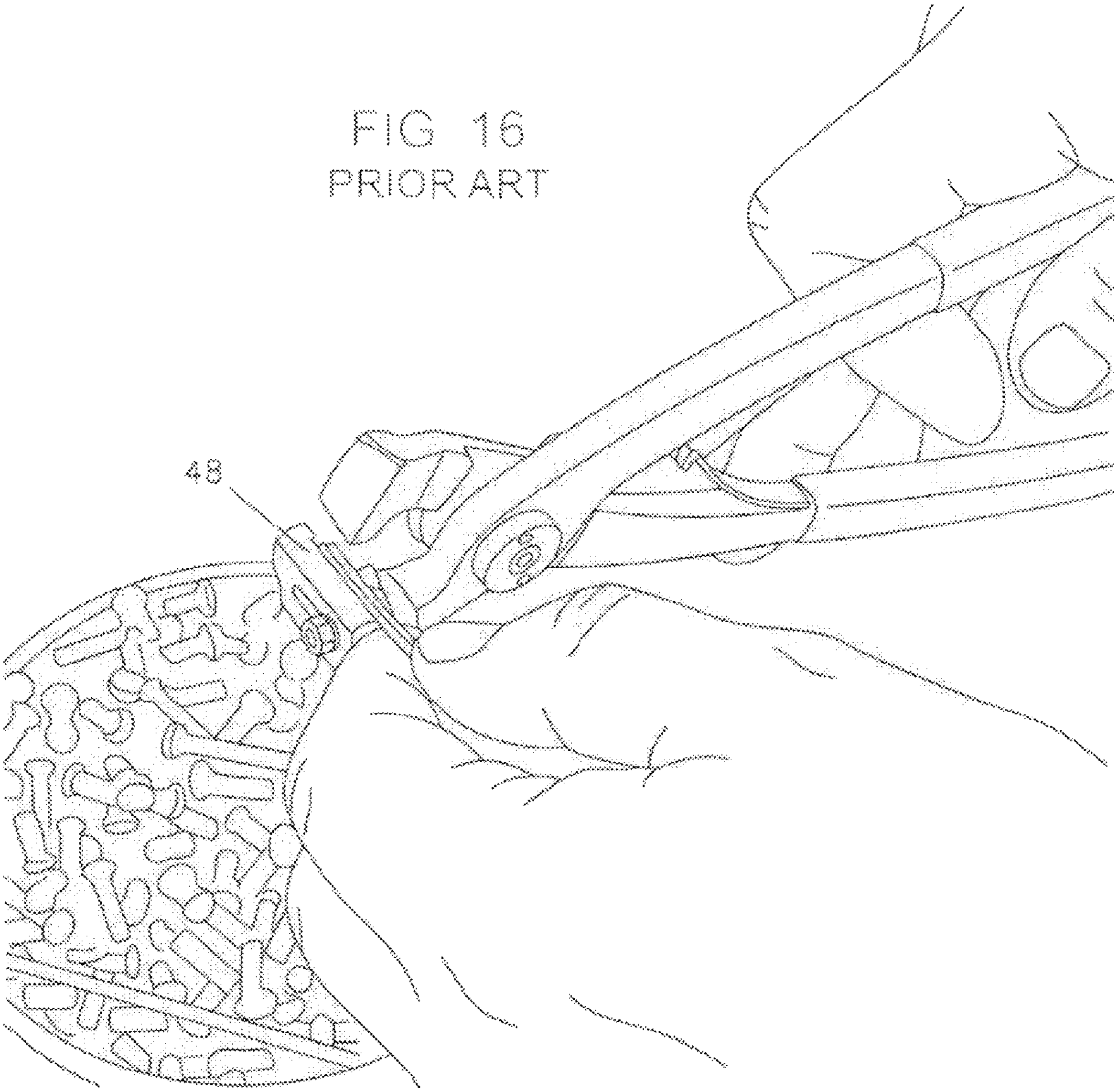
FIG 16 PRIOR ART
FIG. 16 is PRIOR ART illustrating the features of the Summit Fret Tang Cutter. It includes a portion of a user's hand in the photograph/drawing.
Figure 17:
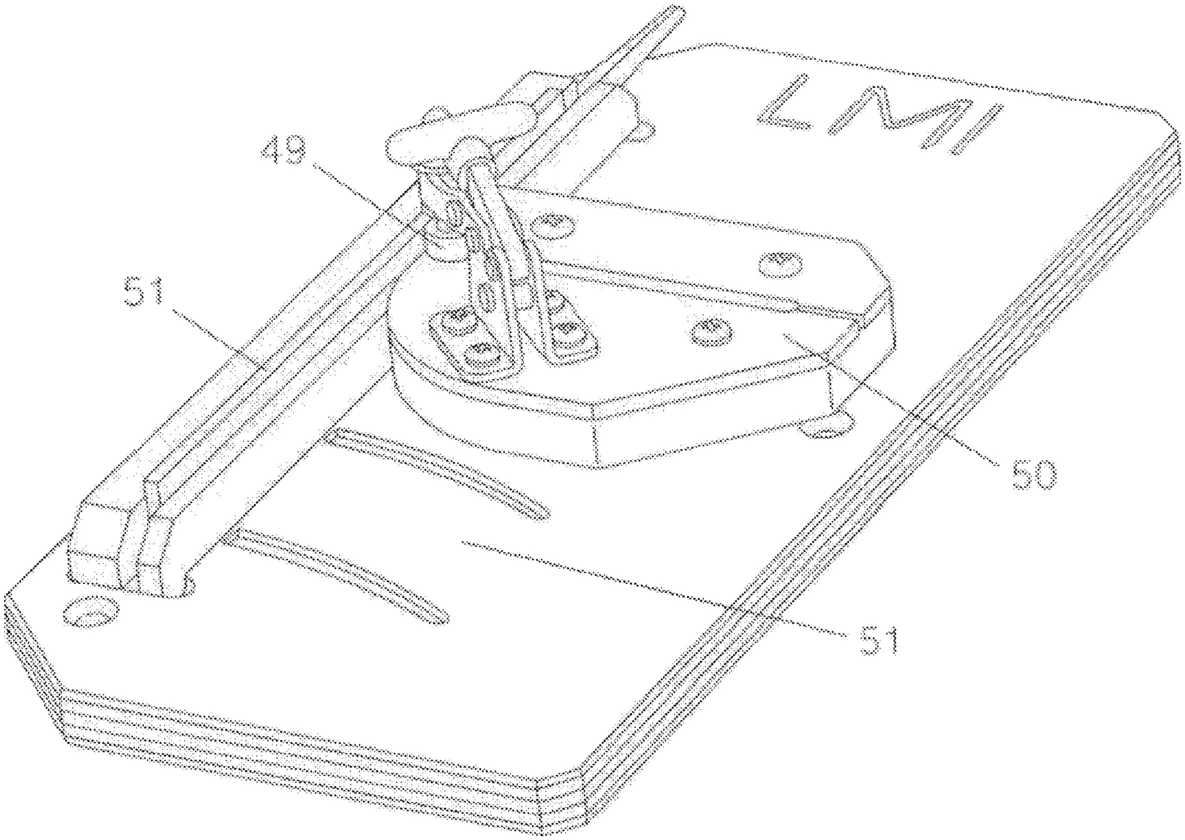
FIG. 17 PRIOR ART
FIG. 17 is PRIOR ART illustrating the features of the LMII Fret Tang Filer.

Other possible embodiments of the inventions include but are not limited to an embodiment with a "monolithic" Guide Block Assembly that is manufactured by 3D-printing, 3D-millling or other effective means (FIG. 13, #32), and which retains such features as a Fret Tang Guide Channel (FIG. 13, #39), Radiused Guide Block Surface (FIG. 13, #27) and Guide Block Mount Plate Adjustment Screws (FIG. 13, #23).

Figure 18:
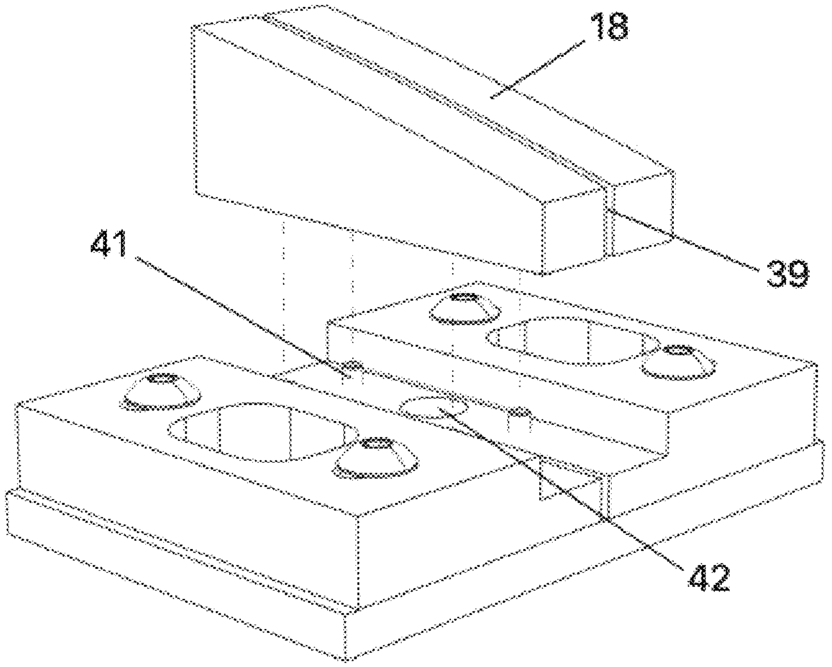
FIG. 18 shows an alternative embodiment of the Guide Block Assembly with Guide Blocks that are indexed in-position via Guide Pins.

Another embodiment of the inventions include a Guide Block Assembly (FIG. 18) with Guide Blocks (FIG. 18, #18) that are indexed in-position via Guide Pins (FIG. 18, #41) and fixably attached via screws, magnets (FIG. 18, #42) or other means such that they can be replaced with different sets of Guide Blocks without affecting the width of the Fret Tang Guide Channel (FIG. 18, #39).

Still another embodiment of the inventions is a "modular" assembly consisting of one or more sub-assemblies.

Yet another embodiment of the inventions includes a guide block assembly with Guide Blocks that have a guide surface with a flat or atypical radius.

Figure 20:
FIG. 20 PRIOR ART
FIG. 20 is a screenshot that shows examples of wheel guides that may be used to feed and guide fret tangs into desired contact with a cutting implement 17 in various embodiments of the inventions.
Figure 21:
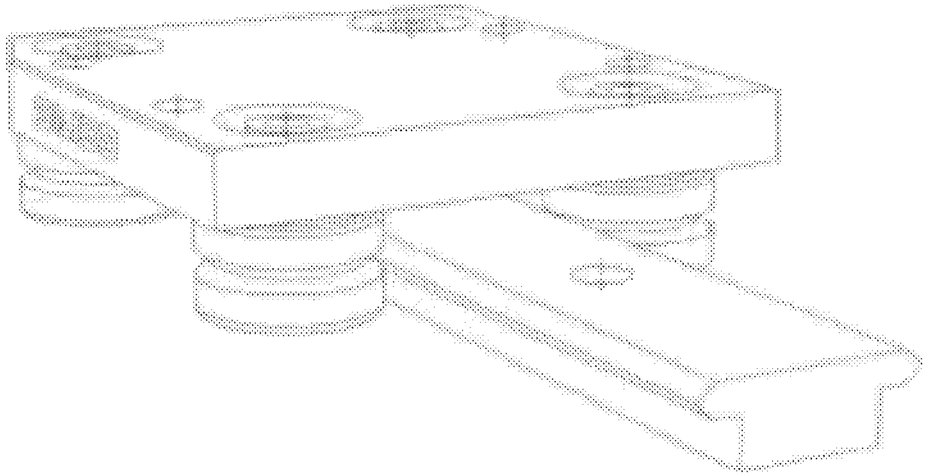
FIG. 21 PRIOR ART
FIG. 21 is a perspective view that shows an example of how wheel guides 21B (such as shown in FIG. 20) may be assembled and used to feed and guide fret tangs such as the element 21A into desired contact with a cutting implement 17 in various embodiments of the inventions.

A further alternative embodiment of the inventions include an assembly which utilizes one or a plurality of guide wheels in place of the guide blocks against which the fret wire is fed. In that regard, FIG. 20 is a screenshot that shows examples of wheel guides that may be used to feed and guide fret tangs into desired contact with a cutting implement 17 in various embodiments of the inventions. FIG. 21 is a perspective view that shows an example of how wheel guides 21B (such as shown in FIG. 20) may be assembled and used to feed and guide fret tangs such as the element 21A into desired "cutting" contact with a cutting implement 17 in various embodiments of the inventions.

Figure 22:
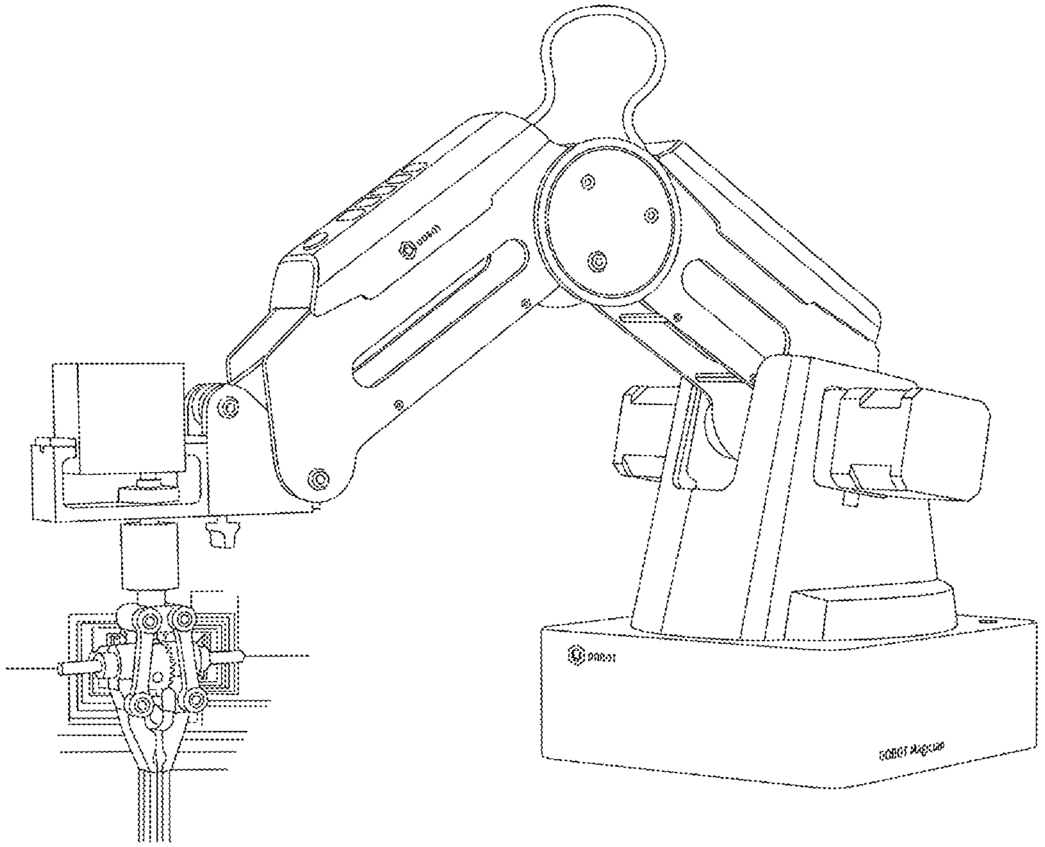
FIG. 22 PRIOR ART
FIG. 22 is a perspective view screenshot that shows an example of a robotic arm that may be assembled and used in various embodiments of the inventions, to adjust the assemblies settings and other components and/or to manipulate the fret tangs into desired contact with a cutting implement 17.

An even further alternative embodiment of the inventions includes an assembly that utilizes a robotic arm or other automated guide mechanism to feed the fret wire into the cutting implement. In that regard, FIG. 22 is a perspective view screenshot that shows an example of a robotic arm that may be assembled and used in various embodiments of the inventions, to adjust the assemblies settings and other components and/or to manipulate the fret tangs into desired contact with a cutting implement 17.

Figure 19:
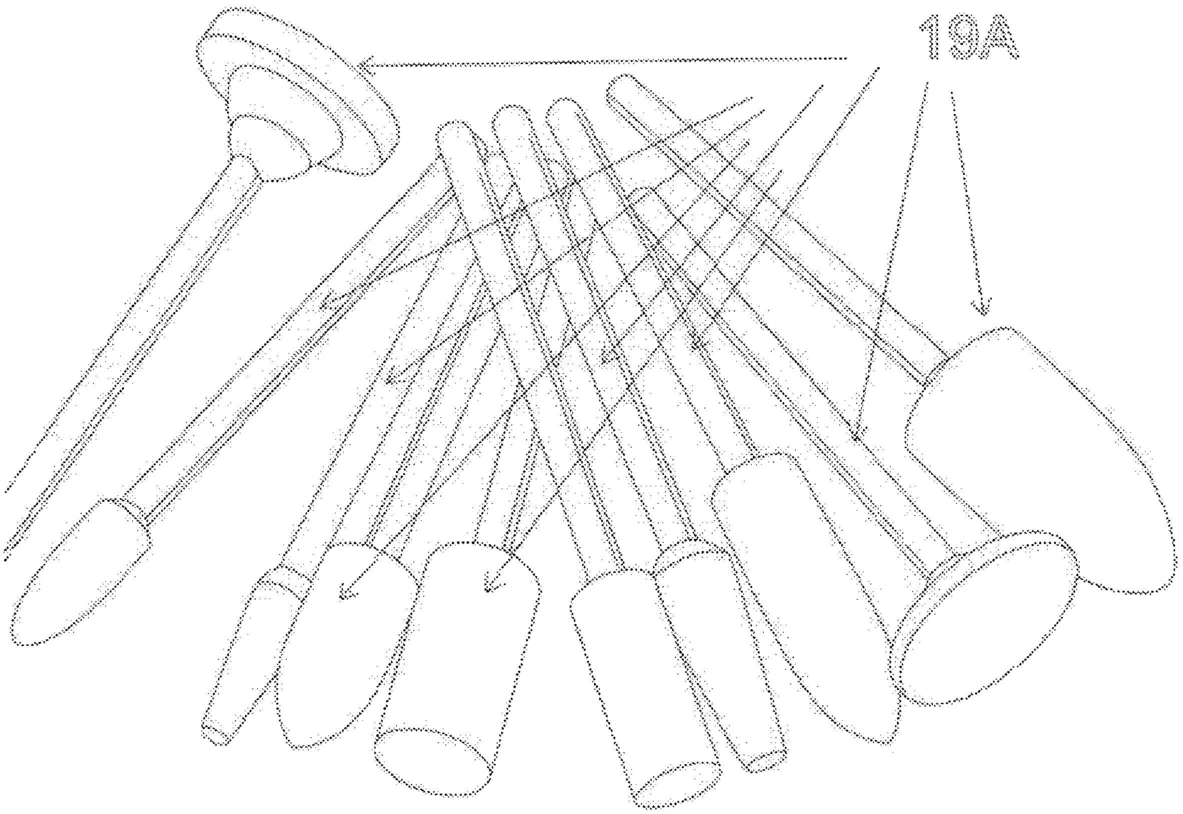
FIG. 19 PRIOR ART
FIG. 19 is a perspective view that shows examples of abrasive grinding bits that may be used to remove fret tang portions using various embodiments of the inventions.

Still a further embodiment of the inventions utilizes an abrasive grinding bit instead of a fluted cutting bit 17. In that regard, FIG. 19 is a perspective view that shows examples of various abrasive grinding bits 19A that may be used to remove fret tang portions in various embodiments of the inventions.

Figure 23:
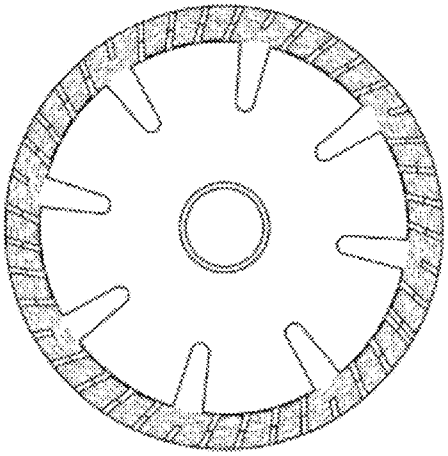
FIG. 23 PRIOR ART
FIGS. 23 and 24 are screenshot photographs that show examples of the many other alternative embodiments of cutting implements (such as implement 17) that can be beneficially used in various embodiments of the inventions.
Figure 24:
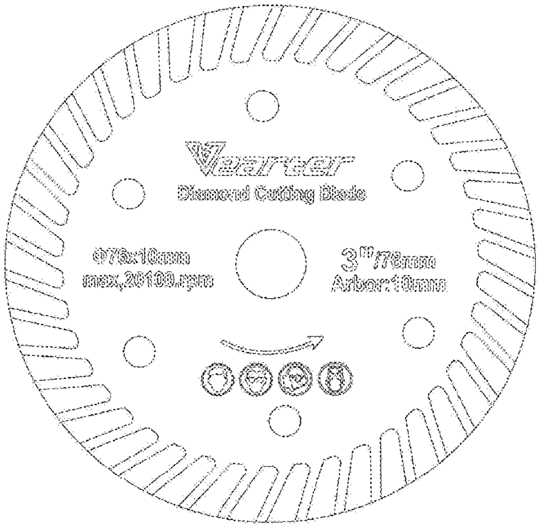
FIG. 24 PRIOR ART

Yet a further embodiment of the inventions utilizes a disc-shaped saw blade, cutting wheel or abrasive wheel driven by a motor that is mounted in an orientation such that the positional relationship between the fret wire guide and the cutting implement's point of contact is able to perform an equivalently successful operation (wherein a successful operation is defined as the complete removal of the intended section of fret tang without deforming the outermost edges of the fret-crown's bottom surface). In that regard, and in addition to the elements illustrated in FIG. 19, FIGS. 23 and 24 are screenshot photographs that show examples of the many other alternative embodiments of cutting implements (such as implement 17) that can be beneficially used in various embodiments of the inventions.

An even further embodiment of the inventions utilizes a non-electric motor to drive the cutting implement.

Figures 1, 2A, 2B:
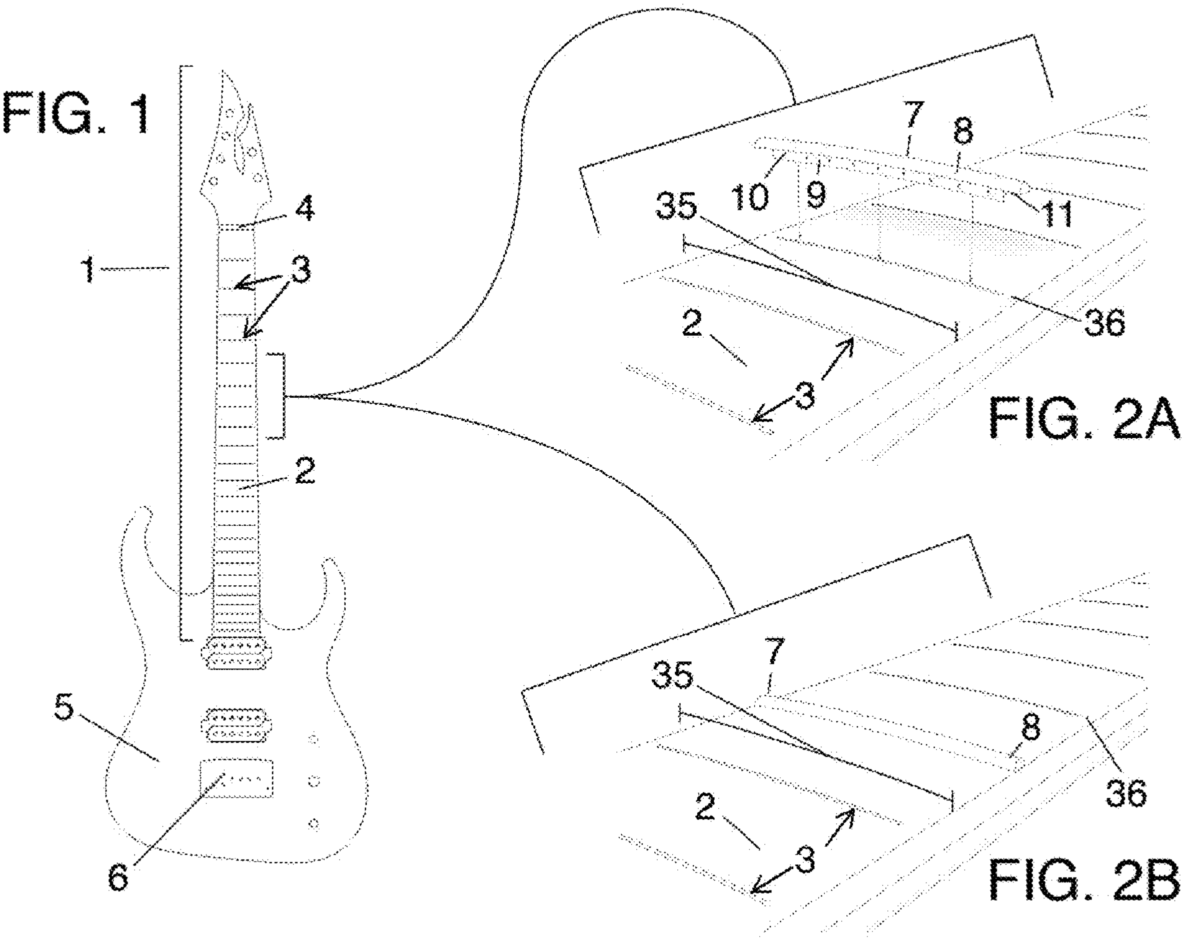
FIG. 1 shows the face of a 6-string electric guitar representative of the known art.
FIG. 2A shows a perspective view of the bracketed section of the FIG. 1 illustration, with a processed piece of fret wire positioned over it.
FIG. 2B shows a perspective view of the bracketed section of the FIG. 1 illustration with the piece of fret wire from FIG. 2A as it would appear once installed.

FIG. 1 serves as background illustrating the face of a 6-string electric guitar representative of the known art, with a Neck 1 and Body 5. Affixed to the face of the body 5 is a bridge 6, which in this embodiment serves as one endpoint for the vibrating portion of each string (not shown.) The surface of the neck between the nut 4 (which serves as the other endpoint for the vibrating portion of each string) and the body 5 is the fretboard 2, which has cut into its face a plurality of fret slots 3. This common embodiment of a fret slot 3 (referred to as "blind" in that it does not extend through the lateral edges of the fretboard 2, leaving a fret end shelf 36 at each end) is one which typically necessitates the fret preparation process for which the Inventions are ideally suited (called "undercutting") to be performed prior to fret installation. Persons of ordinary skill in the art will understand that the concepts and methods described herein are applicable to a multitude of embodiments of fixed-fret musical instruments including but not limited to, acoustic guitars, electric bass guitars, acoustic bass guitars, fretted bowed instruments, banjos and mandolins.

FIG. 2A serves as background and is a close-up perspective view of the bracketed section from FIG. 1, showing in detail the fretboard 2, its lateral curvature (fretboard radius) 35, and "blind" fret slots 3. In FIG. 2A a piece of fret wire 7 is shown as hovering over its respective fret slot 3 with arrows implying the direction in which it would be installed. The piece of fret wire 7 is shown in its typical embodiment with a "crown" 8 and "tang" 9, and "barbs" 10 protruding from the sides of the tang.

In FIG. 2A the piece of fret wire 7 is shown as having been bent into a curvature matching the fretboard's 2 radius 35, cut to the width of the fretboard 2 (at the point of installation,) and with "undercut" ends 11 such that the remaining fret tang 9 can be inserted within the bounds of the "blind" fret slot 3, and have its crown 8 span the full width of the fretboard 2 at the point of installation. The fret wire example in FIG. 2A illustrates the ideal goal that a practitioner of the art of fret undercutting strives to achieve: removing the tang 9 completely from each undercut area 11, while retaining the full height of the crown 8 across its entire length. The Inventions and Methods disclosed herein are uniquely suited for achieving this goal quickly, easily, and repeatably.

FIG. 2B serves as background and is a close-up perspective view of the bracketed section from FIG. 1, showing in detail the fretboard 2, with the piece of fret wire 7 from FIG. 2A fully seated in its fret slot. FIG. 2B illustrates the ideal end result of an undercut fret installed in a "blind" fret slot in that the fret's crown 8 spans the full width of the fretboard 2 and with consistent crown height from end to end.

Figure 3:
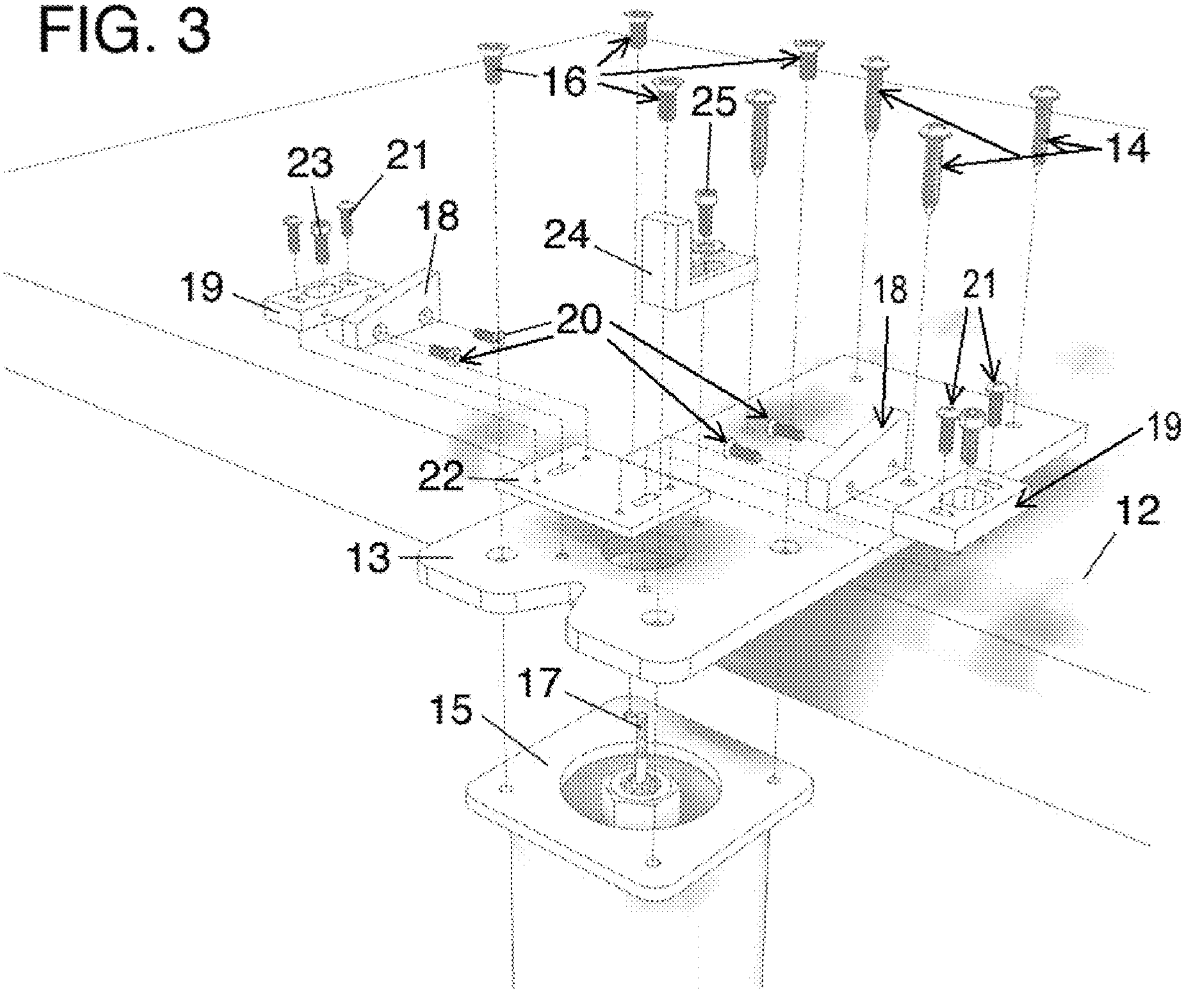
FIG. 3 shows an exploded perspective view of the components constituting the preferred embodiment of the inventions.

In FIG. 3, an embodiment of the invention is shown with its components exploded to illustrate the manner in which they may be assembled. In this embodiment, a fluted cutting implement 17 is installed in the collet of a motorized rotary tool 15 which is then fixedly mounted to a baseplate 13 via screws 16. The baseplate 13 can then be fixedly mounted to a workbench 12 or other suitable surface via screws 14.

Also in this embodiment, two guide block mounts 19 have fixedly attached to each inside face a radiused fret wire guide block 18 via screws 20, and which are adjustably attached to a guide block mount plate 22 via screws 21. This guide block mount plate 22 is then adjustably attached to the baseplate 13 via screws 23. In this embodiment, removing screws 20 allows for the replacement of guide blocks 18 with those of a different top radius to accommodate fret wire of corresponding specifications.

FIG. 3 also illustrates an embodiment of a Depth Stop element 24 which is adjustably attached to the baseplate 13 via a screw 25.

In FIG. 4, an embodiment of the invention is shown as it may be conveniently fixed to a workbench 12. Persons of ordinary skill in the art will understand that many or most or all aspects of the inventions can be practiced in a wide variety of other embodiments, including dedicated standalone machines configured to permit the processes described herein. Among the many other applications of the inventions are partially and/or fully automated systems, in which robotic or other sensors and/or tools (see, for example, FIG. 22) are used to manipulate the cutting bit 17 or other cutting device in relation to the fret to accomplish the desired process.

In FIG. 4, an assembly 31 of the invention includes a base plate 13, wherein first end 33 may be attached (by screws 14 as shown, or any suitable method) to a workbench 12. Again, persons of ordinary skill in the art will understand that, for other embodiments, no "workbench" is required, but instead the cutting bit 17 and related jig for holding and manipulating the fret wire can be on a free-standing "permanent" base, or in some other configuration (not shown).

The base plate 13 preferably includes a second end 34 to which a conventional handheld router ("laminate trimmer") 15 (or other suitable cutting tool) is mounted (by screws 16 as shown, or any suitable method). Persons of ordinary skill in the art will understand that, in the embodiment of FIG. 4, the router's bit 17 extends upwardly through the base plate 13 into a position where it can be used to cut/trim fret wire as described herein.

FIG. 4 also illustrates an embodiment of the Guide Block Assembly 26 and its components 18-23: Guide Blocks 18, Guide Block Mounts 19, and Guide Block Mount Plate 22, adjustably affixed to the Baseplate 13. The space between the inner faces of the guide blocks will be referred to herein as the "Fret Tang Guide Channel" 39. Additionally, FIG. 4 shows an embodiment of the adjustable Depth Stop 24.

Figure 5:
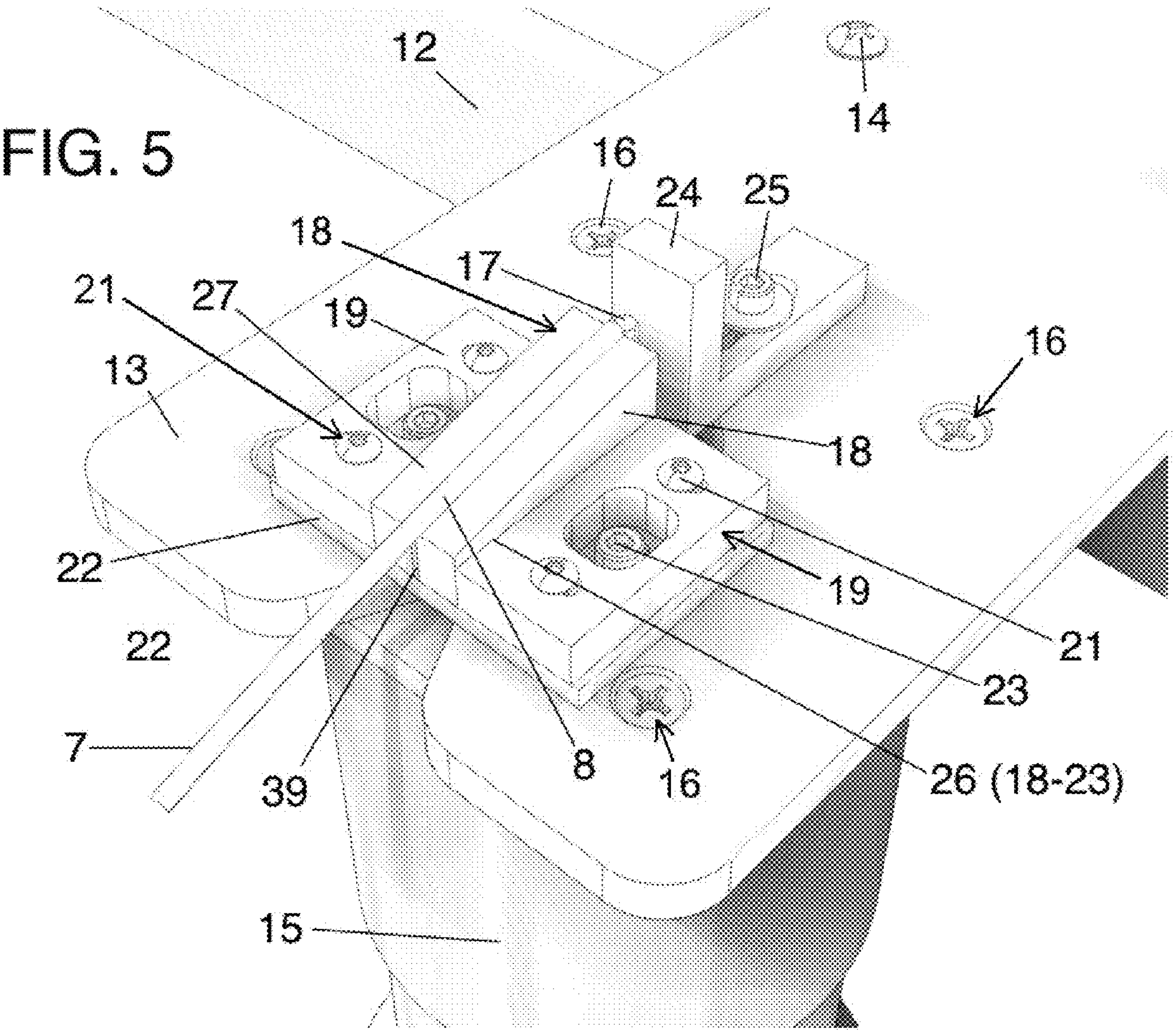
FIG. 5 shows a close-up view of the preferred embodiment of the inventions with a piece of fret wire properly seated between the guide blocks.

In FIG. 5, the guide block assembly 26 from the embodiment of the inventions depicted in FIG. 4 is shown close-up with a piece of fret wire 7 positioned such that its tang is nested in the Fret Tang Guide Channel 39 between the guide blocks 18, and with the bottom surface of its crown 8 resting flush against the radiused top faces 27 of the guide blocks 18.

FIG. 5 illustrates in the abstract how a person of ordinary skill in the art would position a piece of fret wire 7 in this embodiment of the guide block assembly 26 when practicing the inventions.

Figure 6:
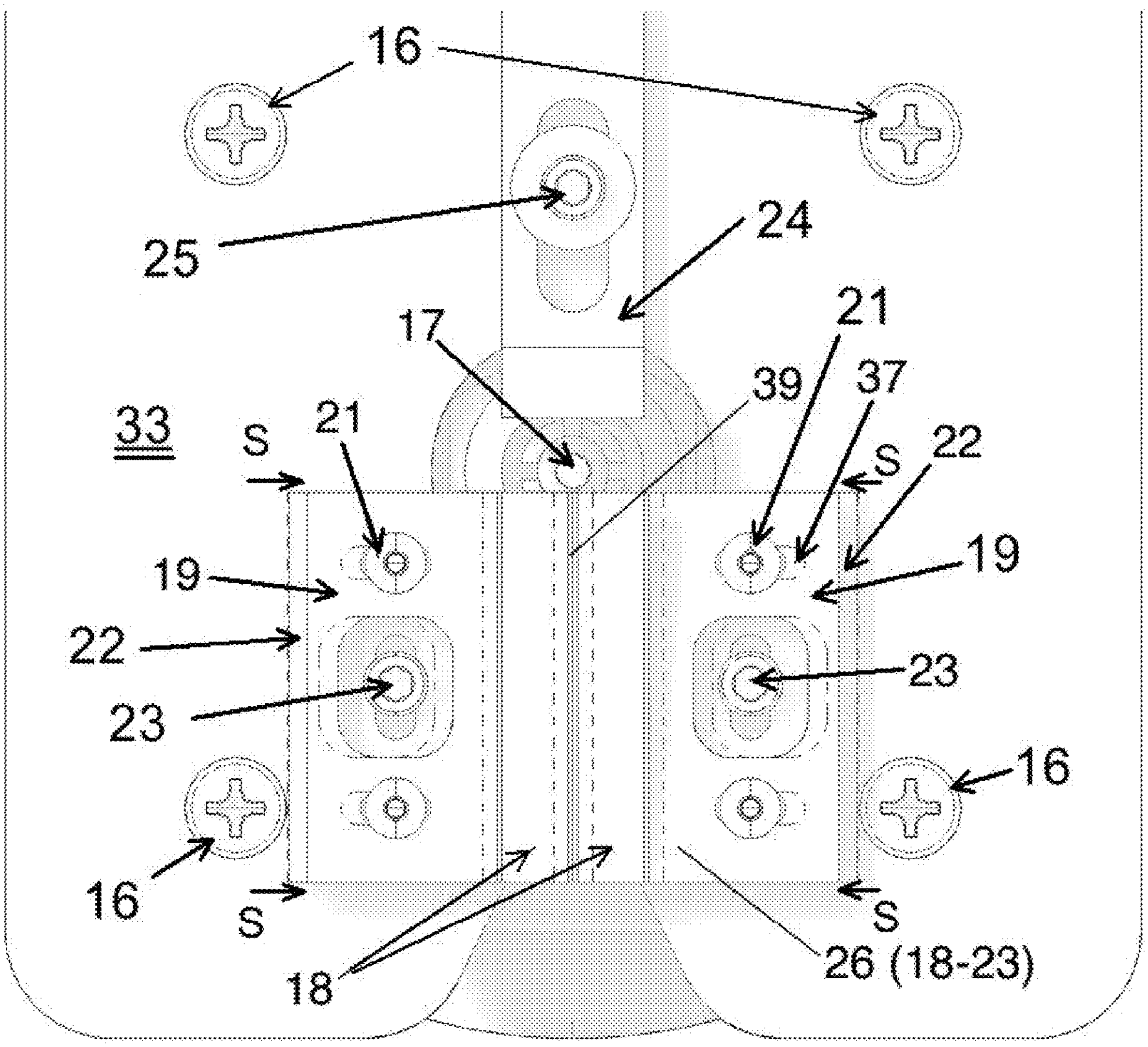
FIG. 6 shows the adjustability of the guide blocks relative to each other.

In FIG. 6 an embodiment of the inventions, specifically the guide block assembly 26, is shown from a top view, to illustrate how the position of the guide block mounts 19 with attached guide blocks 18 can be adjusted relative to the guide block mount plate 22. By loosening screws 21 each guide block mount 19 may be moved laterally along a path defined by guide channels 37 to bring each guide block closer to or further away from the guide block opposite it, thereby narrowing or widening the Fret Tang Guide Block Channel 39 (arrows S illustrate the movement toward the center, making the channel 39 "smaller" in the view shown in FIG. 6, with related dashed lines showing the illustrated relative movement). This adjustability enables a practitioner of the art to adapt the distance between the guide blocks to specifications of the fret wire being processed. The preferred position of the guide blocks 18 relative to each other is typically one in which the parallel distance between their inside faces (Fret Tang Guide Channel 39) is close enough to the major diameter of the fret tang that the lateral deflection of the fret wire under cutting force is minimized, while not being so close as to prevent the fret wire from sliding freely toward the cutting implement 17.

Figure 7:
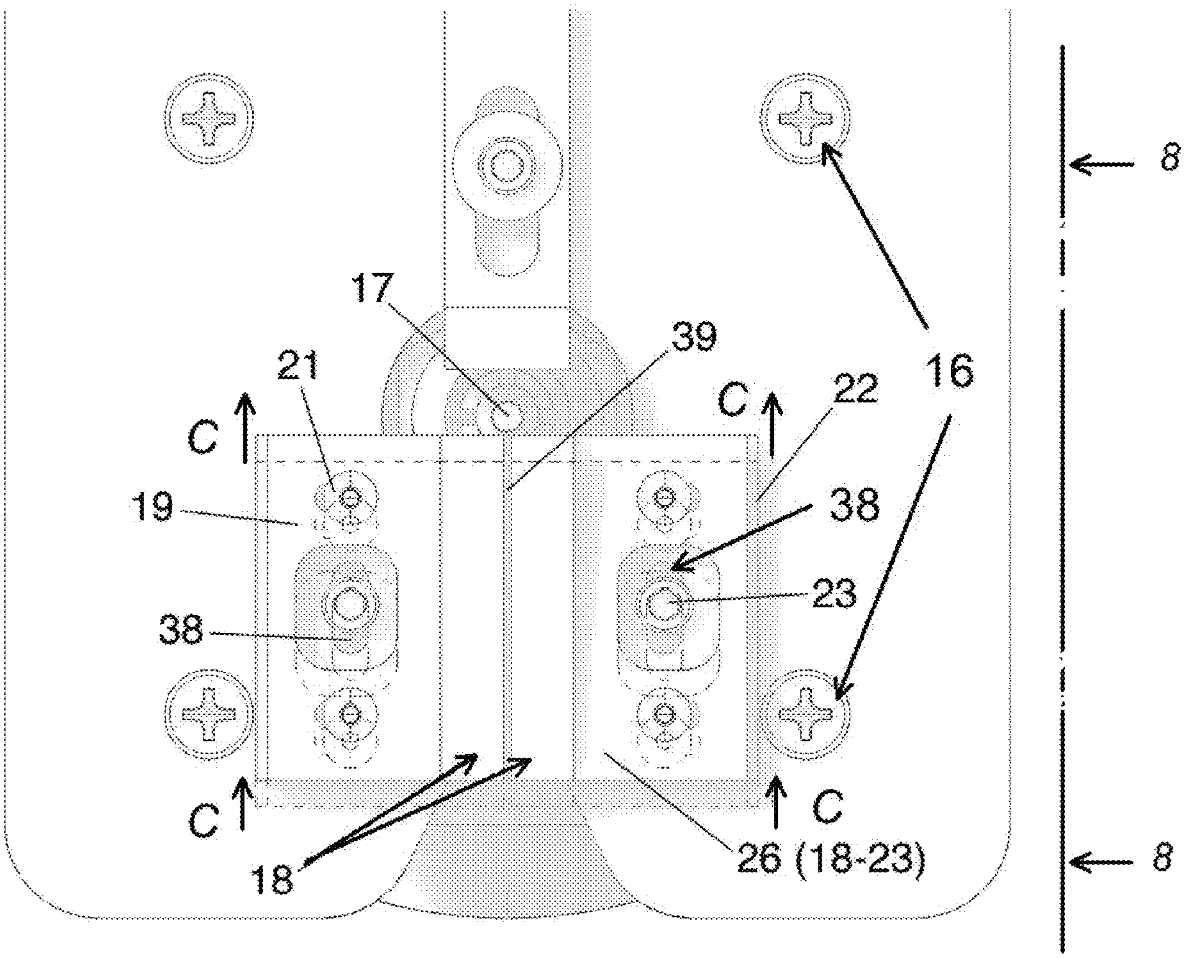
FIG. 7 shows the adjustability of the guide block assembly toward or away from the cutting implement.

In FIG. 7, an embodiment of the guide block assembly 26 is shown from an overhead specific view, illustrating how its position can be adjusted relative to the cutting implement 17. By loosening screws 23, the guide block mount plate 22 (and any sub-assemblies mounted to it) can be moved closer to or further away from the cutting implement 17 along a path dictated by guide channels 38 (arrows C illustrate the movement "closer" to the implement 17, or "upward" in the view shown in FIG. 7, with related dashed lines showing the illustrated relative movement). When utilizing cutting implements of varying diameters, and/or geometry, or setting up the inventions for a particular operation, this adjustability enables a practitioner of the art to maintain a preferred positional relationship between the edge of the guide blocks 18 closest to the cutting implement 17 and the cutting implement itself. Although this may vary from user to user, the preferred position will typically be one where the guide blocks 18 are as close as possible to, but without making contact with, the cutting implement 17 during normal operation, as this position will provide maximum support for the fret tang within the Fret Tang Guide Channel 39 and minimize lateral deflection of the fret wire under cutting force.

Figure 8:
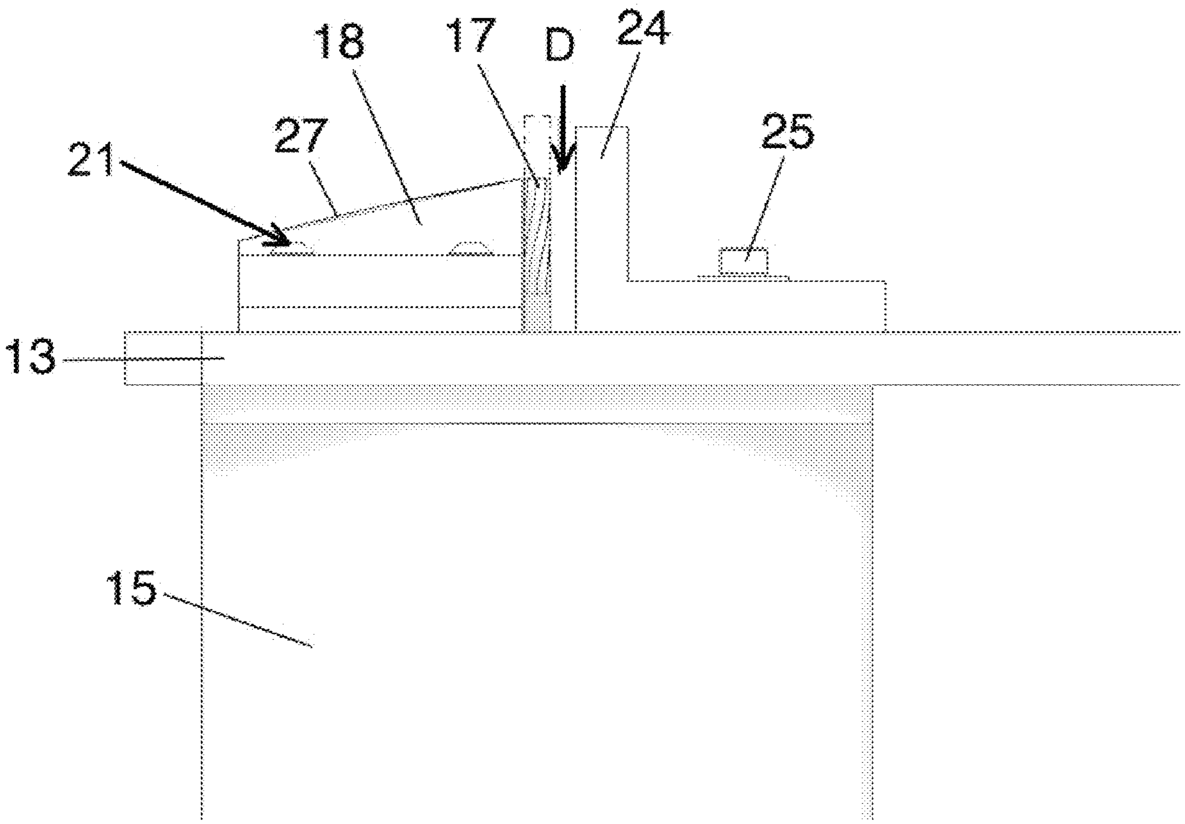
FIG. 8 is a side view taken along line 8-8 of FIG. 7, which shows the adjustability of the cutting implement relative to the rest of the inventions.

In FIG. 8, an embodiment of the inventions is shown from the side, illustrating how the amount by which the cutting implement 17 protrudes from the baseplate 13 can be adjusted. In this embodiment, this adjustment can be made by changing the depth to which the cutting implement 17 is inserted into the rotary tool 15, by changing the distance between the rotary tool and the baseplate 13 via an adjustable mount or "router base" (not shown) or by other means (arrow D and related dashed lines illustrate the movement of the implement 17 "downward" in FIG. 8).

In this embodiment of the inventions, the vertical adjustment of the cutting implement 17 and the position in which it is set relative to a the radiused top surface 27 of a pair of guide blocks 18 allows the practitioner of the inventions to set the amount of material to be removed from the "tang" side of the fret wire with each cutting pass.

Figure 9:
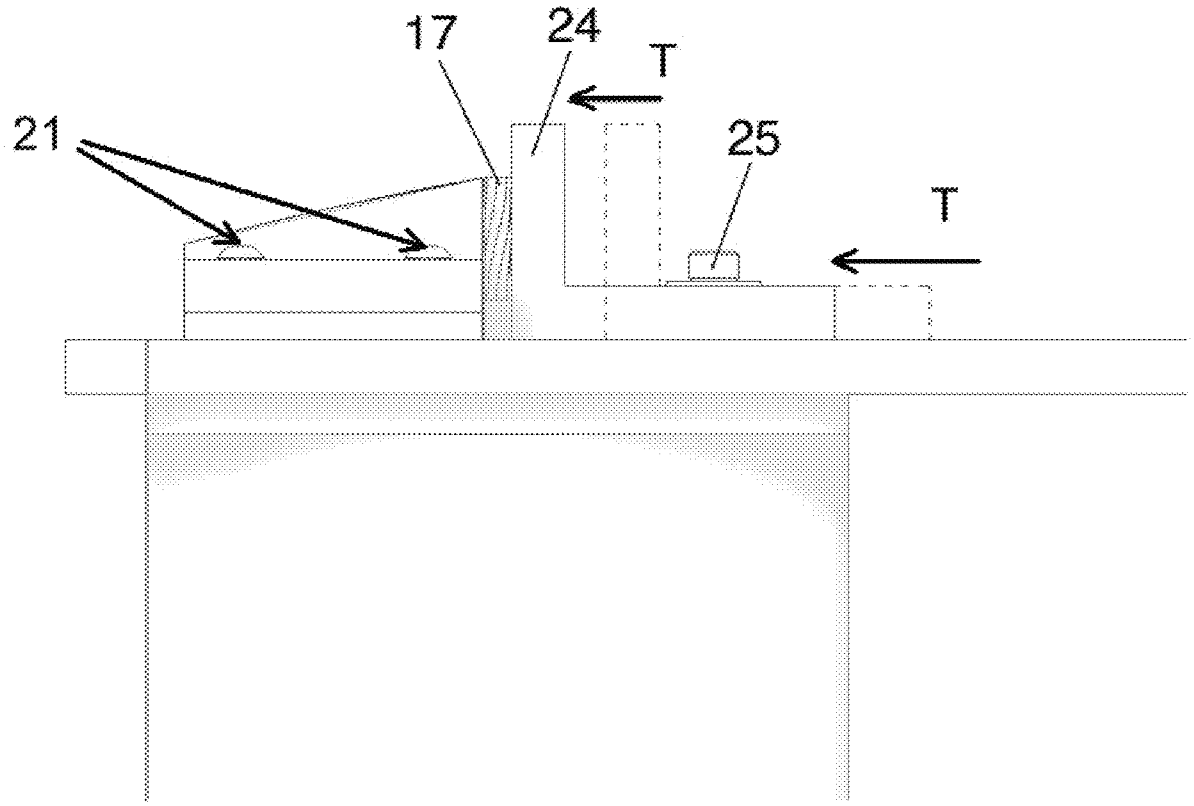
FIG. 9 shows the adjustability of the depth stop toward or away from the cutting implement.

In FIG. 9, an embodiment of the inventions is shown from the side, illustrating the adjustability of an embodiment of the Depth Stop 24. By loosening screw 25, the Depth Stop can be moved closer to or further away from the cutting implement 17, thereby changing the distance past the cutting implement that the crown of a piece of fret wire is able to travel along the cutting path (arrows T and related dashed lines illustrate the movement of the depth stop 24 "toward" implement 17 in FIG. 9). The Depth Stop can take alternative embodiments that function similarly to prevent the fret crown from traveling past a set position along the cutting path and can be either fixedly or adjustably attached by alternative means such as clamps or magnets among others. Another alternative embodiment could utilize a fine adjustment screw to enable the practitioner to achieve an even greater degree of precision in the placement of the Depth Stop.

Figure 10A:
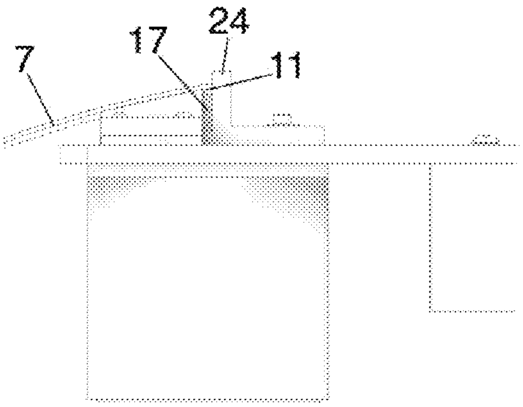
FIGS. 10A-B show the undercutting of pieces of fret wire with the depth stop in multiple positions.
Figure 10B:
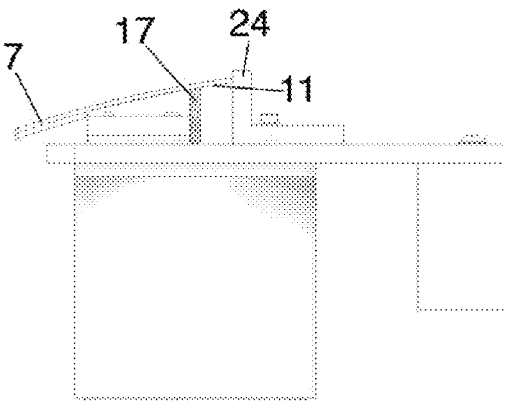

FIGS. 10A-10B show an embodiment of the inventions from a side view and serve to illustrate the purpose of the Depth Stop 24 in greater detail.

In FIG. 10A the Depth Stop 24 has been set extremely close to the cutting implement 17, such that feeding a piece of fret wire 7 into the cutting implement until it contacts the Depth Stop results in an undercut 11 approximately the length of the cutting implement's diameter.

In FIG. 10B the Depth Stop 24 has been set further away from the cutting implement 17, such that feeding a piece of fret wire 7 into the cutting implement until it contacts the Depth Stop results in an undercut 11 approximately four times the length of the cutting implement's diameter.

Figure 11A:
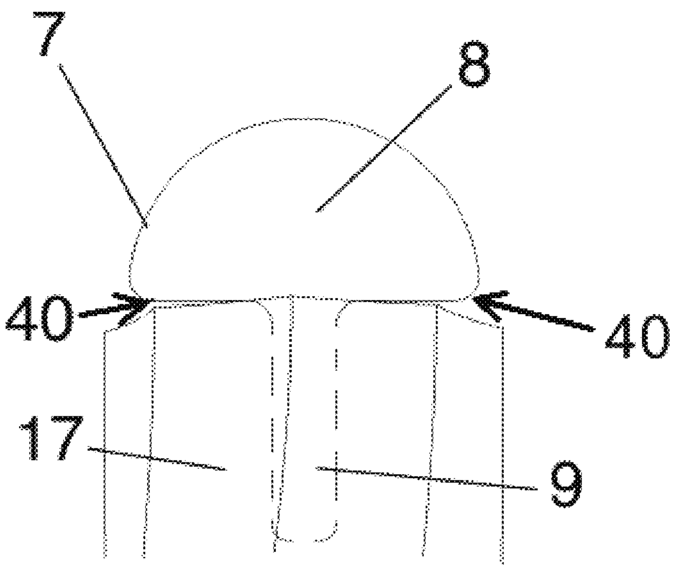
FIGS. 11A-B show the relationship between the cutting implement and the piece of fret wire at the point of engagement.
Figure 11B:
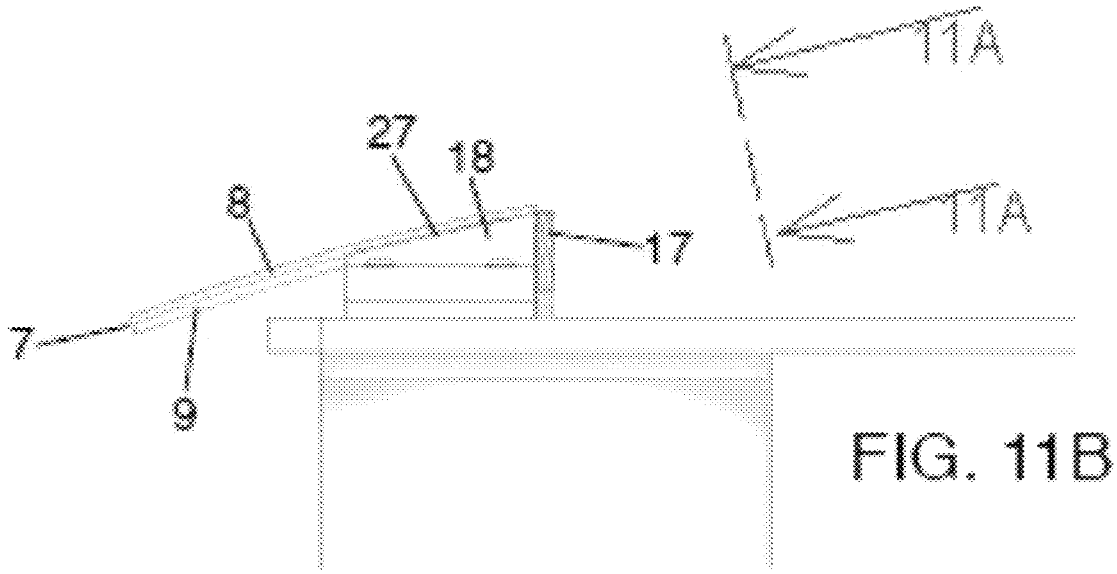
Figure 12A:
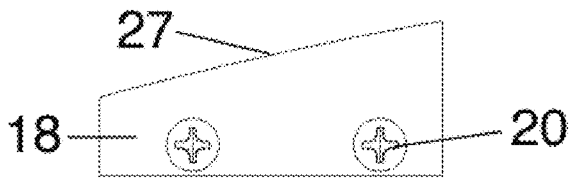
FIGS. 12A-D show side elevation views of four possible embodiments of Guide Blocks with differing guide surface radii.
Figure 12B:
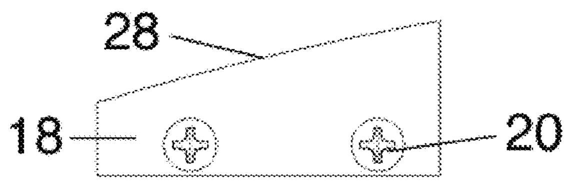
Figure 12C:
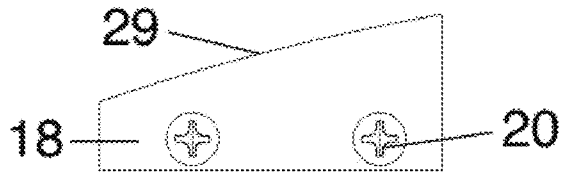
Figure 12D:
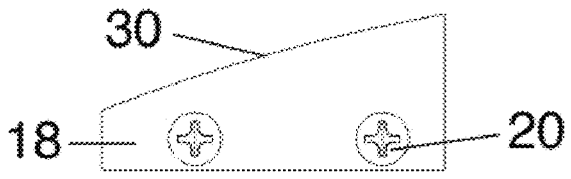

In FIG. 11A the end of a Piece of Fret wire 7 and cutting implement 17 are shown juxtaposed in a close-up detail view, and this view is shown as it relates to a side view of an embodiment of the inventions (FIG. 11B). In FIG. 11A, the geometry of the top edge of a cutting implement 17 is shown as it would appear when viewing the face of a perfect 90-degree cross-section of a piece of fret wire at their point-of-engagement. This geometry is shown to illustrate that the angular relationship between the piece of fret wire and the cutting implement (as dictated by the radiused top surface 27 of the guide blocks 18 in this embodiment of the Guide Block Assembly) allows for the complete removal of the Fret Tang 9 (shown in dashed lines) without the Cutting Implement 17 contacting the outermost edges 40 (to the left and right in FIG. 11A) of the bottom of the Fret Crown 8.

In FIG. 12, four versions of an embodiment of a Guide Block are shown from a side view, each with a top surface bearing a different common guitar fretboard radius. FIG. 12A depicts a Guide Block 18 with a 16" radius top surface 27, FIG. 12B depicts a Guide Block 18 with a 12" radius top surface 28, FIG. 12C depicts a Guide Block 18 with a 9.5" radius top surface 29, and FIG. 12D depicts a Guide Block 18 with a 7.25" radius top surface 30. In this embodiment, despite the variance in top surface radii, each guide block has Guide Block Mounting Screws 20 with identical center-to-center distances, and which are also identically spaced from the bottom surface of each guide block respectively. The homogeneity of this specification allows Guide Blocks of different radii to be attached to the same set of Guide Block Mounts. Additionally, all guide blocks regardless of radius have the same overall height, and the same break angle between their tallest face and the radiused top surface at their point of intersection. The homogeneity of these specifications keeps the relationship between the piece of fret wire being processed and the cutting implement as close and consistent as possible, regardless of radius, and allows a practitioner of the inventions to change radius blocks with minimal necessary adjustments to the rest of the assembly. In other words, in the embodiments illustrated in FIGS. 12A-D, the left side of each block 18 preferably accommodates the radius change (by being correspondingly shorter/lower for a smaller radius block 18), while the right side of the blocks 18 remains consistent.

In order to describe and summarize the present inventions, certain objects and advantages have been described herein. In any particular embodiment of the inventions, not necessarily all such objects or advantages may be achieved. Thus, for example, those skilled in the art will recognize that the invention may be embodied or carried out in a manner that achieves or optimizes one advantage or group of advantages as disclosed herein, without necessarily achieving other objects or advantages as may be disclosed or suggested herein.

The apparatus and methods of the inventions have been described with some particularity, but the specific designs, constructions, and steps disclosed are not to be taken as delimiting of the inventions. A wide range of modifications and alternative structures and steps for practicing the inventions will make themselves apparent to those of ordinary skill in the art, all of which will not depart from the essence of the inventions, and all such changes and modifications are intended to be encompassed within the appended claims.

What is claimed is:

1. Apparatus for fret wire preparation and undercutting, including:

a guide element configured to guide fret wire so that during fret wire insertion into said guide element, the fret wire maintains a consistent trajectory and lateral deflection of said fret wire is minimized during operation of a cutting implement;

said cutting implement configured to receive the fret wire and remove the intended portion of a fret tang;

said guide element further including a guide block mount plate to which said guide block mounts are adjustably attached, said guide block mount plate allowing adjustability of space between said guide blocks to accommodate the width of said fret tang to be removed;

further comprising a baseplate configured to be mounted to a work surface and adapted for fixed attachment of a rotary tool, wherein said guide block mount plate is adjustably affixed to the base plate.

2. The apparatus of claim 1, said guide element including a plurality of guide blocks containing a guide channel positioned between said plurality of guide blocks and configured to guide the fret wire during insertion into said guide element, said guide channel sized and configured to accommodate the fret wire.

3. The apparatus of claim 2, said guide element further including guide block mounts to which said guide blocks are fixedly attached, said guide block mounts ensuring proper alignment of said guide blocks relative to each other.

4. The apparatus of claim 2, wherein said guide blocks have a radiused guide surface.

5. The apparatus of claim 2, wherein said guide element includes at least one guide wheel in place of said guide blocks against which the fret wire is fed.

6. The apparatus of claim 1, further including a sled plate adjustably attached to said baseplate to facilitate movement of said guide element closer to or farther away from said cutting implement.

7. The apparatus of claim 1 or claim 6, further including a depth stop element configured to limit a maximum distance that a crown portion of the fret wire can travel past said cutting implement.

8. The apparatus of claim 7, wherein said depth stop positioning is adjustable to control the length of undercutting on the fret wire tang.

9. The apparatus of claim 1, wherein said guide element is a monolithic assembly.

10. The apparatus of claim 1, wherein said guide element is a modular assembly comprising one or more sub-assemblies.

11. The apparatus of claim 1, wherein said guide element utilizes an automated guiding mechanism to feed the fret wire into said cutting implement.

12. The apparatus of claim 1, wherein said cutting implement comprises a fluted cutting bit.

13. The apparatus of claim 1, wherein said cutting implement comprises an abrasive grinding bit.

14. Apparatus for undercutting fret wire of stringed instruments, including:

a baseplate configured to be mounted to a work surface and adapted for fixed attachment of a rotary tool containing a fret wire cutting element;

a guide block mount plate adjustably affixed to said base plate;

a plurality of guide block mounts adjustably affixed to said guide block mount plate;

a plurality of guide blocks, each said guide block fixedly attached to a corresponding one of the plurality of said guide block mounts, said guide blocks being spaced from each other to provide a channel between said guide blocks for guiding fret wire, said spacing between said guide blocks being adjustable to accommodate the width of fret tang of the fret wire to be removed; and a depth stop adjustably attached to said base plate and configured to limit a maximum distance that a crown portion of the fret wire can travel past said cutting element.

15. A method of undercutting fret wire of stringed instruments, including the steps of:

providing the apparatus of claim 14;

adjusting the spacing between said guide blocks to accommodate the fret wire to be processed; aligning the fret wire in said channel; activating said cutting element;

feeding the fret wire into said cutting element.

16. Apparatus for fret wire preparation and undercutting, including:

a guide element configured to hold at least one fret wire said fret wire having an end to be undercut that is generally directed toward a cutting implement, said fret wire having a remaining body with a lengthwise axis that extends generally away from said cutting implement, said guide element further structured to (a) permit movement of said fret wire selectively toward and/or away from said cutting implement to movement generally along said fret wire lengthwise axis, and (b) restrict movement of said fret wire laterally with respect to said lengthwise axis.

17. A method of undercutting fret wire of stringed instruments, including the steps of:

providing the apparatus of claim 16;

assembling a fret wire into operative engagement with said guide element; and moving said assembly selectively toward and then away from said cutting implement to remove tang material from said fret wire.

18. Apparatus for fret wire preparation and undercutting, including:

a pre-radiused fret wire having a lengthwise axis and a crown portion extending generally along that axis, said crown portion having a generally flat lower surface, said fret wire also having a tang interrupting that generally flat lower crown surface and extending generally downwardly therefrom and along said lengthwise axis, and at least one set of selectable blocks that can be selected to match the radius of a pre-radiused fret wire, said blocks structured to hold said fret wire in a desired alignment with a cutting implement.

19. A method of undercutting fret wire of stringed instruments, including the steps of:

providing the apparatus of claim 18;

selecting a fret wire having a tang;

selecting a set of said blocks that correspond to any lengthwise radius of said fret wire; assembling said fret wire and said blocks; and manipulating said assembly against a cutting implement to desirably remove a portion of said fret wire's tang.

* * * * *